(12) United States Patent
Habele et al.

(10) Patent No.: US 7,588,465 B2
(45) Date of Patent: Sep. 15, 2009

(54) ELECTRIC MAINS-CONNECTION DEVICE FOR AN ELECTRIC HAND-HELD POWER TOOL

(75) Inventors: Michael Habele, Waldenbuch (DE); Klaus Dengler, Kornwestheim (DE); Csaba Kreiter, Stuttgart (DE); Martin Schulz, Stuttgart (DE); Ulrich Single, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 11/677,840

(22) Filed: Feb. 22, 2007

(65) Prior Publication Data

US 2007/0264869 A1    Nov. 15, 2007

(30) Foreign Application Priority Data

May 17, 2006  (DE) ........................ 10 2006 022 996

(51) Int. Cl.
   *H01R 13/66* (2006.01)
(52) U.S. Cl. ..................... 439/620.09; 310/50
(58) Field of Classification Search ............... 439/568, 439/810–814, 620.09; 310/50, 71, 72, 68 R; 438/810–814, 620.09
   See application file for complete search history.

(56) References Cited

U.S. PATENT DOCUMENTS

| | | | | |
|---|---|---|---|---|
| 3,336,490 A | * | 8/1967 | Yelpo et al. | 310/50 |
| 3,484,632 A | * | 12/1969 | Opalenik et al. | 310/68 R |
| 3,761,774 A | * | 9/1973 | Laughinghouse et al. | 361/45 |
| 4,118,614 A | * | 10/1978 | Leibundgut | 307/126 |
| 4,241,297 A | * | 12/1980 | Piber et al. | 318/17 |
| 4,412,160 A | * | 10/1983 | Kojima et al. | 318/280 |
| 5,018,983 A | * | 5/1991 | Bittel et al. | 439/76.1 |
| 5,020,517 A | * | 6/1991 | Foster et al. | 601/57 |
| 5,734,212 A | * | 3/1998 | Uffelman | 310/51 |
| 7,285,019 B2 | * | 10/2007 | Sakai et al. | 439/620.09 |

FOREIGN PATENT DOCUMENTS

GB    946268    1/1964

\* cited by examiner

*Primary Examiner*—Neil Abrams
(74) *Attorney, Agent, or Firm*—Michael J. Striker

(57) ABSTRACT

An electric mains-connection device for an electric hand-held power tool equipped with an electric motor (M), in particular for an angle grinder, has mains-connection terminals for a mains-connection cable, and with an anti-interference capacitor; it is designed as a mains-connection module that can be actuated externally, includes mains terminals, houses the anti-interference capacitor, and out of which an electric cable extends, which serves to connect motor electronics and a motor switch in an interface-free manner. An electric device for an electric hand-held power tool equipped with an electric motor, in particular for an angle grinder, includes the electric mains-connection device.

10 Claims, 3 Drawing Sheets

ELECTRIC MAINS-CONNECTION DEVICE FOR AN ELECTRIC HAND-HELD POWER TOOL

CROSS-REFERENCE TO A RELATED APPLICATION

The invention described and claimed hereinbelow is also described in German Patent Application DE 102006022996.7 filed on May 15, 2006. This German Patent Application, whose subject matter is incorporated here by reference, provides the basis for a claim of priority of invention under 35 U.S.C. 119(a)-(d).

BACKGROUND OF THE INVENTION

The present invention relates to an electric mains-connection device. The invention also relates to an electric device of a hand-held power tool of this type.

Higher-performance electric hand-held power tools must be connected to the electric network as their power supply. This is usually realized using a mains-connection cable that is permanently attached to the device. The electric hand-held power tool also typically includes a motor switch, with which the electric motor on the electric hand-held power tool can be turned on and off. To prevent interference emitted by the electric motor from entering the electric network, electric hand-held power tools are typically equipped with an anti-interference capacitor that is located in the direct vicinity of the electric motor or in the region of the path of the mains-connection cable in a housing of the electric hand-held power tool, e.g., in the region of mains terminals.

It is therefore necessary to electrically connect several components with each other and to locate them in the housing of the electric hand-held power tool in a logical manner. In the related art it is known to provide the mains terminals for the mains-connection cable that is guided into the housing from the outside, the anti-interference capacitor, and additional interfaces, e.g., as plug connections, on a type of carrier plate. The additional interfaces serve to contact the electric motor, the switch, and/or any motor electronics that may be present. It is therefore necessary to connect several electrical components with each other and with a cable. The anti-interference capacitor, in particular, must be connected to the current path in a suitable manner; this is typically accomplished by attaching connectors using screws or soldering. The connections to be created must be realized mechanically using a large number of manufacturing steps, or by using human labor. A great deal of effort is required. The components must also be fixed in place mechanically; this also requires a great deal of fabrication outlay.

SUMMARY OF THE INVENTION

Accordingly, it is an object of the present invention to provide an electric mains-connection device for an electric hand-power tool, which is an improvement of the existing devices.

In contrast to the existing devices of this type, the inventive electric mains-connection device for an electric hand-held power tool equipped with an electric motor, in particular an angle grinder, is provided, with mains terminals for a mains cable, and with an anti-interference capacitor; it is designed as a mains-connection module that can be actuated externally, includes mains terminals and houses the anti-interference capacitor, and out of which an electric cable extends, which serves to connect motor electronics and a motor switch in an interface-free manner. The mains terminals that serve to receive the mains-connection cable to be inserted into the housing therefore include a device that enables the mains terminals to be opened and closed from outside the mains-connection module, e.g., in the manner of lamp-wire connectors that fix the mains-connection cable in place in the mains terminals using fastening screws, or detachably in another suitable manner, e.g., using self-locking but detachable connecting points.

The anti-interference capacitor is located inside the mains-connection module; it therefore need not be installed in the current path as a separate element, and the fabrication outlay required therefore is eliminated. The connections required to connect motor electronics and the motor switch are realized using cables that are guided out of the mains-connection module in an interface-free manner. In this context, "in an interface-free manner" means there are no break points, particularly in the form of detachable attachments, on the mains-connection module.

In an embodiment of the present invention, it is provided that the mains-connection module includes a base, to which a dust cover is assigned. "Base" is intended to mean an element that is substantially but not necessarily flat and closes off a bottom side of the dust cover. When the base and dust cover are connected, the mains-connection module is closed, and the entire interior of the mains-connection module is enclosed.

In a preferred embodiment, it is provided that housing chambers are formed on the dust cover, in which the mains terminals are located. In this context, "housing chambers" are spacially separated areas inside the dust cover that are designed such that they can accommodate the mains terminals. By placing the mains terminals in housing chambers of this type, it is possible to guide them precisely and distinctly during manufacture. This also ensures that they will be located distinctly in their final positions relative to the remaining components of the mains-connection module.

In a further embodiment of the present invention, it is provided that the dust cover includes a capacitor housing chamber in which the anti-interference capacitor is located. In this case as well, and in a manner similar to that described above for the mains terminals, by providing a defined, separate space for the anti-interference capacitor, a specific region is created inside the dust cover to house the anti-interference capacitor. After the anti-interference capacitor has been installed in this capacitor housing chamber, it therefore has a defined position inside the mains-connection module, which makes it possible to position it distinctly relative to the other components of the mains-connection module and to more easily create contacts, e.g., by plugging in the capacitor connecting wires or forming nodes.

In a further embodiment, it is provided that at least one electric cable that originates at the motor electronics and is guided to the motor switch is snaked through the mains-connection module. In this context, "snaked" means the cable is not separated and/or connected anywhere inside the mains-connection module and, instead, it is guided as a single piece, as it were, through the mains-connection module. By snaking the cable—which is required to control motor electronics and enable the motor switch to switch a motor current on or off—without separating it, i.e., in an interface-free manner, the design is greatly simplified and fabrication outlay is greatly reduced. In addition, a distinct guidance of the cord and complete prefabrication of the assembly are made possible.

In a preferred embodiment it is provided that the mains-connection module is cast, preferably with synthetic resin.

Casting the mains-connection module results in a nearly complete absence of sensitivity to fluctuations in temperature and humidity, and to dust, and it results in a very high level of electric safety (leakage currents are prevented). Casting the mains-connection module also makes it possible to fix the internal components in position in a non-displaceable manner.

The present invention also relates to an electric device for an electric hand-held power tool equipped with an electric motor, in particular for an angle grinder, with an electric mains-connection device, particularly according to one or more of the embodiments described above, with motor electronics and a motor switch it is provided that the electric mains-connection device is designed as a mains-connection module, the motor electronics are designed as a motor electronics module, and the motor switch is designed as a motor switch module—each of which has been cast—and that these components are connected with each other via an electric cable in an interface-free manner. The electric device is therefore a complete, closed assembly that includes the mains-connection module, the motor electronics module, and the motor switch module, which were described above and are also closed, and which have already been connected with each other using an electric cable.

During fabrication of the electric hand-held power tool—during its finally assembly, in particular—it is therefore not necessary to individually connect electrical assemblies or even individual electrical components, and/or to install or locate them in the housing. The entire assembly, from the mains terminal to the cables that lead to the motor, can be prefabricated; it is available in a fully prefabricated state, and can be installed as an entire assembly in the housing. In addition, the only task that remains is to connect the cable that leads to the motor with the motor itself.

In a preferred embodiment, it is provided that the electric device described above has an electric module connecting sequence—relative to the direction of current flow from the outside, i.e., as viewed from the mains connection and toward the motor—in which the mains-connection module is first, followed by the motor electronics module and then the motor switch module. As a result, only three lines are required, which lead to the motor electronics. In addition, the motor can be connected in a two-pole manner; components located at the switch output are free of potential when they are in the switched-off state. As an alternative, a different module-connection sequence can be used, in which the motor switch module is first, followed by the mains-connection module with the capacitor, the motor electronics module, and then the motor, as viewed in the direction of current flow from the outside, i.e., from the mains.

DESCRIPTION OF THE PREFERRED EMBODIMENTS

Figure 1:
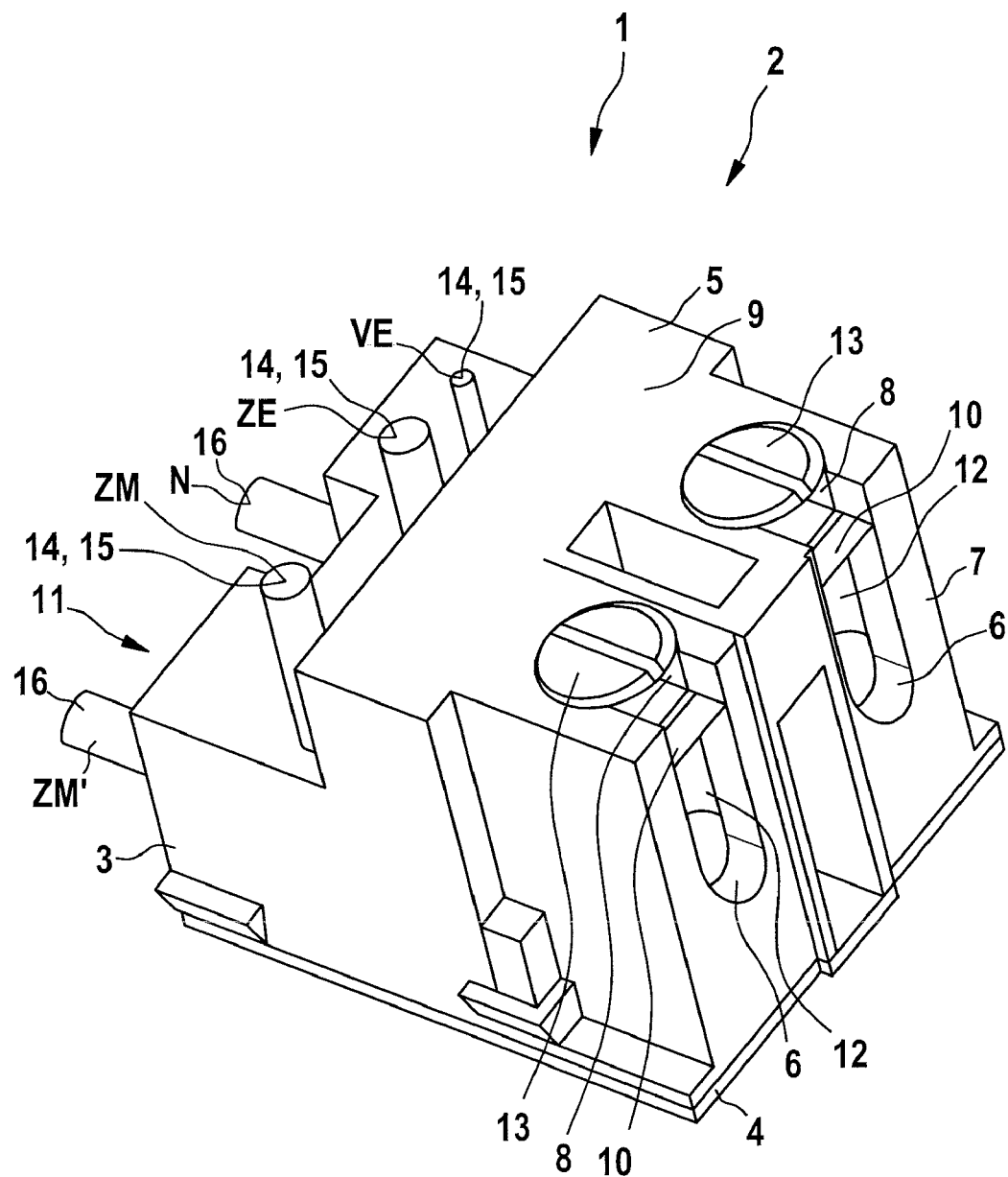
FIG. 1 shows an electric mains-connection device in accordance with the present invention that is designed as a mains-connection module, in a perspective view.

FIG. 1 shows an electric mains-connection device 1 for a not-shown electric hand-held power tool, which is designed as a mains-connection module 2. Mains-connection module 2 is composed of a module body 3, which includes a base 4 and a dust cover 5. Dust cover 5 includes recesses 6 that are formed next to each other in the essentially vertical front side 7 of dust cover 5, and which lead into screw openings 8 that are formed next to each other on a top side 9 of dust cover 5. Top side 9 and front side 7 form an angle of essentially 90°. A segment 10 can be located between recesses 6 and screw openings 8 to reinforce dust cover 5.

Dust cover 5 can be designed essentially cuboid in shape or with a stepped design, as in the current case. "Stepped" means that top side 9 is not designed in a plane from front side 7 to a back side 11 opposite thereto, but is designed in two or more planes, and it is possible for the design to pass back and forth between these planes. Mains-connection module 2 also includes housed mains terminals 12 that are located inside dust cover 5 and behind recesses 6. The not-shown mains lines are connected to mains terminals 12 using screws 13 that are screwed into mains terminals 12 and extend out of—and are accessible via—screw openings 8 on top side 9 of dust cover 5.

Leads 14 that are designed as cables 15 also extend out of top side 9 of dust cover 5. The cables are: A motor electronics power supply line VE, a motor electronics lead ZE, and a motor lead ZM. Terminal leads 16 are formed on back side 11 of mains-connection module 2, i.e., a ground line N and snaked-through motor lead ZM'.

"Snaked-through motor lead ZM'" refers to the unbroken continuation of motor lead ZM.

Figure 2:
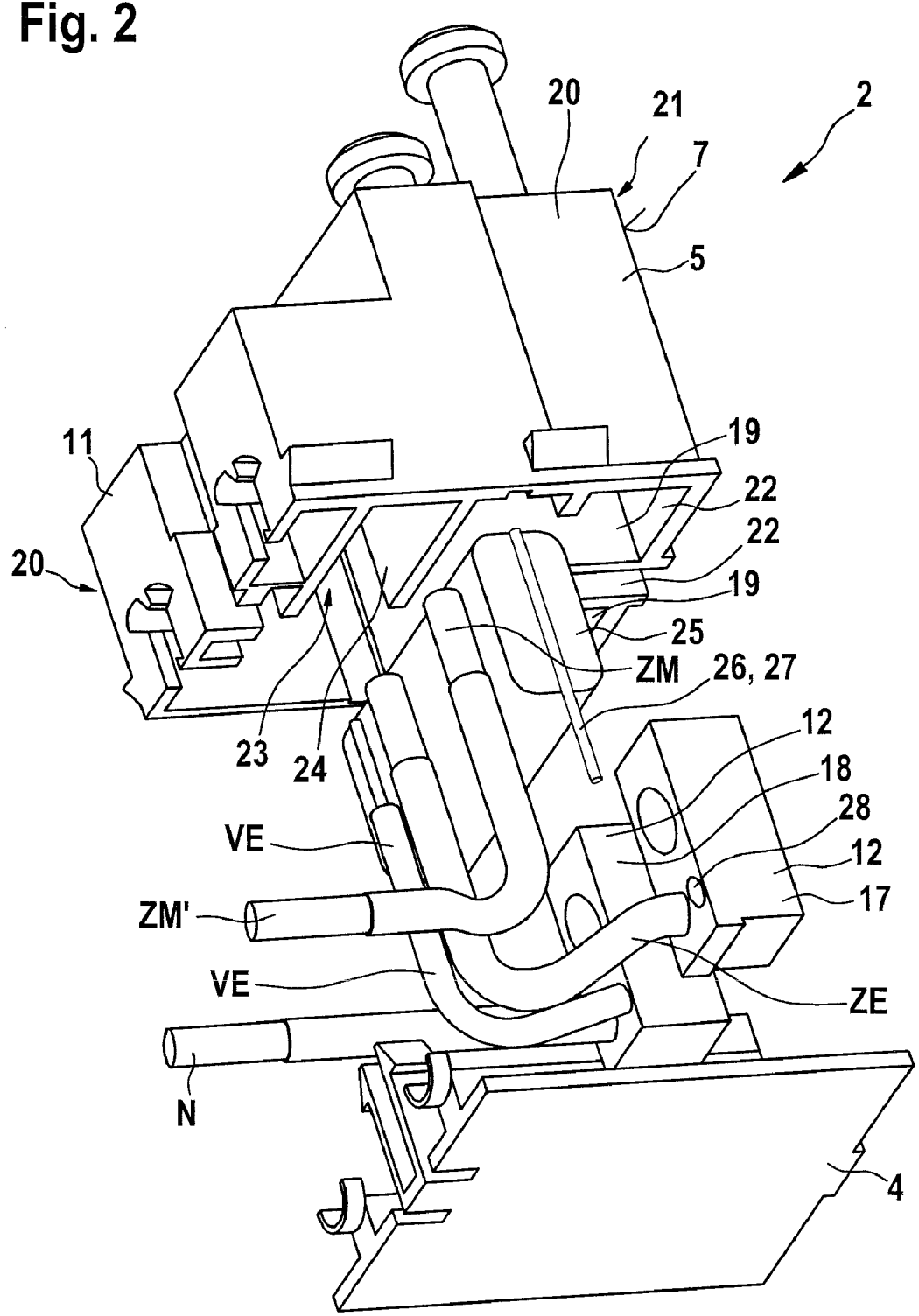
FIG. 2 shows the same mains-connection module in accordance with the present invention, in an exploded view.

FIG. 2 shows an exploded diagram of mains-connection module 2. Dust cover 5 has been lifted off of base 4 in order to show the position of individual components inside mains-connection module 2. One of the mains terminals 12, which is designed as a motor electronics terminal 17, accommodates motor electronics lead ZE inside mains-connection module 2, while the other connection terminal 12 is designed as an electronics supply terminal 18 that accommodates motor electronics power supply line VE inside mains-connection module 2. Motor lead ZM snakes through and leads—without interruption—to back side 11 of mains-connection module 2 as snaked-through module lead ZM'. Inside mains-connection module 2, ground line N—which exits mains-connection module 2 on back side 11—extends to electronics power supply terminal 18. Motor electronics power supply line VE exits the same electronics power supply terminal 18, on top side 9 of mains-connection module 2.

Dust cover 5 includes housing chambers 19 for accommodating mains terminals 12, which are formed between front side 7 of dust cover 5 and one of the side walls 20 of dust cover 5 in front-side region 21 of dust cover 5. Inside dust cover 5, housing chambers 19 are bounded by inner walls 22. A capacitor housing chamber 23 is located adjacently thereto, in the direction toward back side 11 of dust cover 5, and it is separated from housing chambers 19 by a partition 24. Capacitor housing chamber 23 accommodates an anti-interference capacitor 25 that, after mains-connection module 2 is closed, i.e., after base 4 and dust cover 5 are joined, is housed entirely in mains-connection module 2.

Anti-interference capacitor 25 includes capacitor connections 26, only one of which is visible, due to the perspective shown. Capacitor connections 26 are designed as connecting wires 27 that are guided out of anti-interference capacitor 25. Connecting wires 27 are inserted into boreholes 28—provided for this purposes—of mains terminals 12, for contacting purposes. Only one borehole 28 is shown here as well, due to the perspective, i.e., the borehole on motor electronics terminal 17. When mains-connection module 2 is assembled, i.e., when base 4 and dust cover 5 are joined after the above-described components are installed, the components are fixed in position securely and distinctly, and the components are positioned relative to each other in a distinct manner.

To provide particularly advantageous protection of the mains-connection module against humidity and to create a very good seal against dust, it is also possible to insert a not-shown casting compound, a synthetic resin in particular, into the interior of mains-connection module 2 upon assembly. This results in a complete casting of mains-connection module 2 and its components contained therein, thereby fixing them in position relative to each other, stabilizing their particular contact position, and sealing them against any type of influences. This also results in excellent electric insulation and very good protection against leakage currents.

Figure 3:
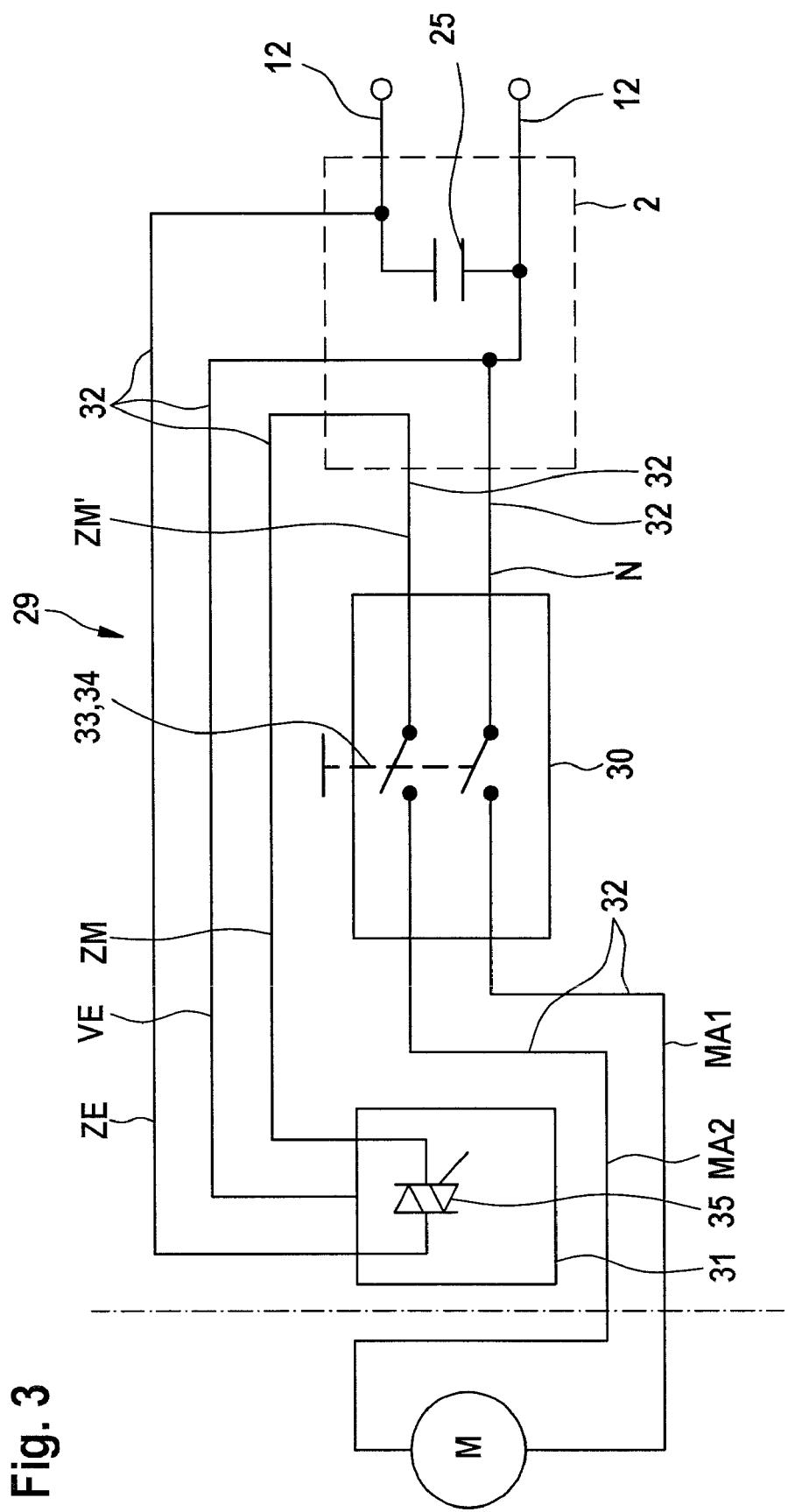
FIG. 3 shows a wiring diagram for an electric device—depicted using symbols—for an electric hand-held power tool that is equipped with an electric motor in accordance with the present invention.

FIG. 3 shows, using symbols, an electric device 29 for a not-shown electric hand-held power tool equipped with an electric motor M. Electric motor M is shown only to illustrate the wiring of electric device 29. It is not part of electric device 29. Electric device 29 is composed of schematically depicted mains-connection module 2, a motor switch module 30, and a motor electronics module 31, all of which are connected with each other using an electric cable 32 in an interface-free manner. Mains-connection module 2 includes, in particular, anti-interference capacitor 25. Motor switch module 30 includes a motor switch 33, which is designed as a two-pole break contact 34.

Motor electronics module 31 includes power electronics 35 for regulating the power of electric motor M. Mains-connection module 2 includes mains terminals 12, via which mains-connection module 2 is connected to the electric network, in particular via a not-shown mains-connection cable. Motor electronics lead ZE, motor electronics power supply line VE, and motor lead ZM—which are electric cables 32—extend out of mains-connection module 2, and they all lead into motor electronics module 31. Snaked-through motor lead ZM' and ground line N also extend out of mains-connection module 2 as electric cables 32, and they lead into motor switch module 30.

Motor connection line $MA_1$ and motor connection line $MA_2$ extend out of motor switch module 30 as electric cables 32, and they lead into electric motor M. The electric connection therefore takes place in the sequence: Mains-connection module, motor electronics module, and motor switch module. This means the motor switch module is located after the motor electronics module in the electric current flow. In the case of two-pole separation, this ensures there is no potential at the components that are contacted at the switch output.

It will be understood that each of the elements described above, or two or more together, may also find a useful application in other types of constructions differing from the type described above.

While the invention has been illustrated and described as embodied in an electric mains-connection device for an electric hand-held power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An electric mains-connection device for an electric hand-held power tool provided with an electric motor, the device comprising:
    mains terminals for a mains-connection cable, the mains terminals actuatable from outside the electric mains-connection device; and
    a mains connection module comprising a housing enclosing the mains terminals, the mains connection module further comprising an anti-interference capacitor, and an electric cable, which extends out of the mains connection module for connecting to motor electronics and a motor switch in an interface-free manner, wherein said electric cable originates at said motor electronics, snakes through the mains-connection module, and is guided to said motor switch.

2. An electric mains-connection device as defined in claim 1, wherein said mains-connection module includes a base, to which a dust cover is assigned.

3. An electric mains-connection device as defined in claim 2; and further comprising housing chambers formed on said dust cover, in which said mains terminals are located.

4. An electric mains-connection device as defined in claim 2, wherein said dust cover includes a capacitor housing chamber in which said anti-interference capacitor is located.

5. An electric mains-connection device as defined in claim 1, wherein said mains-connection module is configured as a cast module.

6. An electric mains-connection device as defined in claim 1, wherein said mains-connection module is configured as a module cast with synthetic resin.

7. An electric device for an electric hand-held power tool, comprising an electric mains-connection device having mains terminals for a mains-connection cable, which mains connection terminals are actuatable from outside the electric device, and a mains connection module that enclose the mains connection terminals, the mains connection module comprising an anti-interference capacitor, and an electric cable, which extends out of the mains connection module for connecting to motor electronics and a motor switch in an interface-free manner, wherein said electric cable originates at said motor electronics, snakes through the mains-connection module, and is guided to said motor switch.

8. An electric device as defined in claim 7, wherein the motor electronics is configured as a motor electronic module, while the motor switch is configured as a motor switch module.

9. An electric device as defined in claim 8, wherein each of said mains-connection module, said motor electronics module, and said motor switch module is configured as a cast module, and said mains-connection module, said motor electronics module and said switch module are connected with each other via said electric cable in an interface-free manner.

10. An electric device as defined in claim 8, wherein said mains-connection module, said motor electronic module, and said motor switch module are configured and arranged so as to provide an electric module switching sequence to said mains-connection module, said motor electronics module, and said motor switch module.

* * * * *